United States Patent
Feiling et al.

(10) Patent No.: US 11,389,887 B2
(45) Date of Patent: Jul. 19, 2022

(54) METHOD OF REMOVING CR(VI) IONS FROM AN AQUEOUS ELECTROLYTE SOLUTION

(71) Applicant: MTU Aero Engines AG, Munich (DE)

(72) Inventors: Nicole Feiling, Munich (DE); Max Niegl, Munich (DE); Martin Koenitzer, Munich (DE); Norbert Rast, Munich (DE); Rudolf Hill, Langenfeld (DE); Dieter Mauer, Leverkusen (DE)

(73) Assignee: MTU AERO ENGINES AG, Munich (DE)

( * ) Notice: Subject to any disclaimer, the term of this patent is extended or adjusted under 35 U.S.C. 154(b) by 366 days.

(21) Appl. No.: 16/748,876

(22) Filed: Jan. 22, 2020

(65) Prior Publication Data

US 2020/0238411 A1  Jul. 30, 2020

(30) Foreign Application Priority Data

Jan. 24, 2019  (DE) .......................... 102019200832.1

(51) Int. Cl.
  *B23H 3/10*  (2006.01)
  *B01J 39/05*  (2017.01)
  (Continued)

(52) U.S. Cl.
  CPC ............... *B23H 3/10* (2013.01); *B01J 39/05* (2017.01); *C02F 1/68* (2013.01); *C02F 1/705* (2013.01);
  (Continued)

(58) Field of Classification Search
  None
  See application file for complete search history.

(56) References Cited

U.S. PATENT DOCUMENTS 3,573,181 A * 3/1971 Cochran ............... C01B 25/238
  210/688
3,725,259 A * 4/1973 Depree .................... C02F 9/00
  210/684
(Continued)

FOREIGN PATENT DOCUMENTS

DE  2622928 A1  11/1976
DE  3303585 C1  2/1984
(Continued)

OTHER PUBLICATIONS

Koehler, S. C., "Auswahl und Einsatz von eisenhaltigen Fuellmaterialien fuer permeable reaktive Barrieren (PRB) zur in situ Grundwassersanierung am Beispiel eines Chromschadenfalls", Doctoral Thesis ETH Zuerich 2004.
(Continued)

*Primary Examiner* — Chester T Barry
(74) *Attorney, Agent, or Firm* — Abel Schillinger, LLP

(57) ABSTRACT

The invention relates to a method for removing Cr(VI) ions from an aqueous electrolyte solution, particularly an electrolyte solution for electrochemical metal machining, which comprises the reduction of Cr(VI) to Cr(III) with Fe(II) ions. The Fe(II) ions are added to the electrolyte solution in the form of an aqueous salt solution which has been brought into contact with an ion exchange resin loaded with Fe(II) ions. The invention further relates to a device (1) for electrochemical machining of a workpiece (2) by means of an aqueous electrolyte solution (6), which has an ion exchanger (11) which has been loaded with an ion exchange resin charged with Fe(II) ions.

20 Claims, 1 Drawing Sheet

(51) Int. Cl.
*C02F 1/68* (2006.01)
*C02F 1/70* (2006.01)
*C02F 101/22* (2006.01)
*C02F 103/16* (2006.01)

(52) U.S. Cl.
CPC ...... *C02F 2101/22* (2013.01); *C02F 2103/16* (2013.01)

(56) References Cited

U.S. PATENT DOCUMENTS

| | | |
|---|---|---|
| 3,909,381 A | 9/1975 | Ehrsam |
| 4,040,920 A | 8/1977 | Takada et al. |
| 4,504,370 A | 3/1985 | Lindner et al. |
| 5,407,650 A | 4/1995 | Hartmann et al. |
| 5,415,848 A * | 5/1995 | Thornton ............ C25F 7/02 423/166 |
| 5,427,692 A | 6/1995 | Thornton |
| 5,496,449 A * | 3/1996 | Ishibashi ............ C23G 1/36 204/520 |
| 5,739,497 A * | 4/1998 | Tanaka ............ B23H 7/36 219/69.17 |
| 5,783,061 A | 7/1998 | Schuurman et al. |
| 6,221,234 B1 | 4/2001 | Mancia et al. |
| 2006/0144711 A1* | 7/2006 | Kobata ............ B23H 9/00 205/82 |
| 2006/0292059 A1* | 12/2006 | DiMascio ............ C01B 11/024 502/79 |
| 2008/0217164 A1* | 9/2008 | Toma ............ C25F 7/00 204/230.7 |
| 2010/0154840 A1 | 6/2010 | Enda et al. |

FOREIGN PATENT DOCUMENTS

| | | |
|---|---|---|
| DE | 4243559 A1 | 6/1994 |
| DE | 10247318 A1 | 4/2004 |
| DE | 102016004819 A1 | 10/2017 |
| EP | 0832042 B1 | 4/1998 |
| EP | 2386377 B1 | 11/2011 |
| GB | 2393969 A | 4/2004 |

OTHER PUBLICATIONS

Kurath, D. E., et al., "Ion Exchange Studies for Removal of Sulfate from Hanford Tank Waste Envelope C (241-AN-107) Using SuperLig(R) 655 Resin" In: PNWD-3053, BNFL-RPT-036, Rev. 0, Aug. 2000, Washington, pp. 1-98.

Jin Wei et al., "Electrochemical processes for the environmental remediation of toxic Cr(VI): A review", Electrochimica Acta, Elsevier, Amsterdam, NL, vol. 91, Jan. 27, 2016, pp. 1044-1055.

Vinuth, M. et al., "Remediation of hexavalent chromium from aqueous solution using clay mineral Fe(II)-montmorillonite: Encompassing anion exclusion impact", Applied Science 357 (2015), pp. 1244-1250.

He, X. et al., "Remediation of hexavalent chromium in contaminated soil by Fe(II)—Al layered double hydroxide", Chemosphere 210 (2018), pp. 1157-1166.

\* cited by examiner

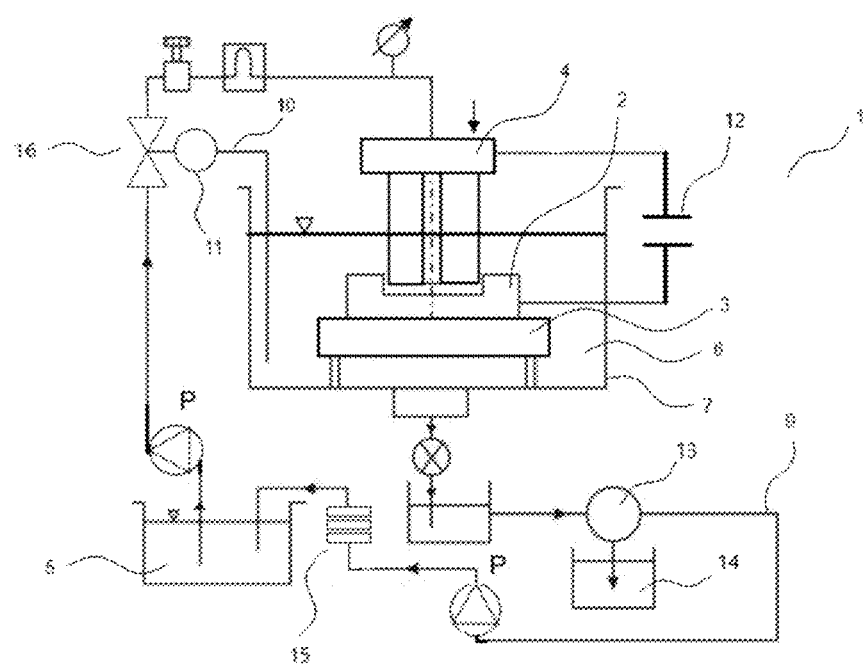

METHOD OF REMOVING CR(VI) IONS FROM AN AQUEOUS ELECTROLYTE SOLUTION

CROSS-REFERENCE TO RELATED APPLICATIONS

The present application claims priority under 35 U.S.C. § 119 of German Patent Application No. 102019200832.1, filed Jan. 24, 2019, the entire disclosure of which is expressly incorporated by reference herein.

BACKGROUND OF THE INVENTION

1. Field of the Invention

The present invention relates to a method for removing Cr(VI) ions from an aqueous electrolyte solution, particularly an electrolyte solution which is used for electrochemical metal machining, by reduction of the Cr(VI) ions to Cr(III) ions by addition of an aqueous solution comprising Fe(II) ions. Accumulating metal hydroxide precipitate can be subsequently removed from the electrolyte solution thus treated. The invention further relates to a device in which such a method takes effect.

2. Discussion of Background Information

In electrochemical machining (ECM: electrochemical machining; PECM: precise electrochemical machining), there is an electrolyte solution between the anode (workpiece to be machined) and cathode (tool) and an electric current flows which ablates the (electrically conducting) workpiece. A salt solution, generally sodium nitrate, is used as electrolyte. Therefore, when using the ECM method, the alloy constituents of the workpiece are dissolved anodically and go into solution. The resulting metal cations (e.g. $Ni^{2+}$, $Fe^{2+}$, $Fe^{3+}$, $Cr^{6+}$, etc.) either accumulate continuously in the electrolyte or they form a metal hydroxide precipitate which can be removed from the system, for example by filtration. Cr(VI) ions accumulate in the electrolyte. These impurities can result in process fluctuations. Furthermore, Cr(VI) has been classified by the ECHA (European Chemicals Agency) as an SVHC=CMR substance (carcinogenic, mutagenic, toxic for reproduction). Therefore, Cr(VI) must be removed from the process or the electrolyte solution by reduction to Cr(III) and subsequent precipitation.

Customary treatment processes for the reduction of Cr(VI) ions are batchwise processing with iron(II) sulfate or continuous processing with sodium dithionite. Both methods have the disadvantage that, as a result, sulfate ions form or are entrained into the electrolytes, which accumulate continuously in the electrolyte solution. The electrolyte solution has to be regularly discarded or partially renewed in order to avoid process fluctuations.

DE 10 2016 004 819 A1 describes a method for removing chromium compounds from electrolyte solutions. In this case, ascorbic acid is used for the reduction of Cr(VI) to Cr(III). The advantage is that no electrolyte-polluting ions are used. However, the degradation products of ascorbic acid remain in the electrolyte and can lead to undesirable secondary reactions.

DE 10 247 318 A1 describes a method for metal depletion in nitrate electrolytes. The nitrate-containing electrolyte, which is contaminated with heavy metal cations, is removed from the system by electrodialysis (membrane method). The metal cations are separated off as a concentrate and discarded. The method is carried out in batchwise mode.

EP 0 832 042 B1 describes a method for removing chromium and iron compounds from an aqueous electrolyte solution. In this case, hydrogen peroxide is used with adjustment of the pH. The method is carried out in batchwise mode.

EP 2 386 377 B1 describes a method for obtaining a reusable electrolyte from the ECM machining of nickel, iron and chromium. By addition of an organic solution, a biphasic heterogeneous mixture is produced. After several process steps, the aqueous phase is again separated off (reusable electrolyte). The method is carried out in batchwise mode.

DE 33 03 585 C1 describes a method for the treatment of sodium nitrate electrolytes in the electrochemical machining of iron-containing materials. Passivation is minimized by the use of ozone (oxidation of nitrite to nitrate). Contamination of the electrolyte by Cr(VI) is not described in this document.

It would, therefore, be advantageous to have available a method for the reduction and removal of Cr(VI) ions from an aqueous electrolyte solution which may be carried out simply and continuously and especially enables simple removal of chromium ions from the electrolyte solution without entraining (particularly potentially interfering) foreign ions, for example sulfate ions, into the electrolytes.

SUMMARY OF THE INVENTION

The present invention provides a method having the features of the independent method claim and a device as claimed in the independent device claim. Advantageous configurations are the subject matter of the dependent claims.

In the method according to the invention for removing Cr(VI) ions from an aqueous electrolyte solution, comprising the reduction of Cr(VI) to Cr(III) with Fe(II) ions, the Fe(II) ions are added to the electrolyte solution in the form of an aqueous salt solution which had previously been brought into contact with an ion exchange resin loaded with Fe(II) ions or the like. As a result, it is avoided that counterions (foreign ions), which would be present in the case of the use of an Fe(II) salt solution (such as sulfate ions in the case of the use of Fe(II) sulfate), are entrained into the electrolyte solution.

Contacting the aqueous salt solution with the charged ion exchange resin can be achieved, for example, by passing the aqueous salt solution over an ion exchange bed or through an ion exchange column.

In a preferred configuration of the method according to the invention, the electrolyte solution is a neutral or basic solution and is especially an aqueous electrolyte solution which is used for electrochemical metal machining (ECM/PECM) of a workpiece comprising a chromium-containing metal alloy.

The workpiece can be a workpiece composed of any metal alloy during electromechanical machining (inter alia) of which Cr(VI) ions are formed and go into solution. For example, the workpiece may consist of a nickel-based alloy or at least comprise the same. Further ions, which can form during electromechanical machining of a workpiece, are for example $Ni^{2+}$, $Co^{2+}$, $Fe^{3+}$ and $Mo^{2+}$.

The electrolyte solution preferably comprises sodium nitrate but may also comprise other electrolytes instead of or in addition to sodium nitrate. Non-limiting examples of such electrolytes include sodium chloride, sodium bromide, potassium nitrate, sodium nitrite, potassium bromide, sodium chlorate and sodium perchlorate.

Although the aqueous Fe(II)-containing salt solution to be added according to the invention to the aqueous electrolyte solution can be any salt solution, this salt solution is expediently essentially identical to the electrolyte solution to be treated in the case of an electrolyte solution for the electromechanical machining of a workpiece, with the exception that it comprises additionally Fe(II) ions (and optionally smaller amounts of further non-interfering metal ions from a metal machining already conducted) (and is substantially free of Cr(VI) ions).

In a preferred configuration of the method according to the invention, the ion exchange resin charged with Fe(II) ions, which is used for preparing the aqueous Fe(II)-containing salt solution, is prepared by treating a (preferably strongly) acidic ion exchange resin with an aqueous Fe(II) salt solution. The aqueous Fe(II) salt solution can be, for example, an Fe(II) sulfate solution. However, other Fe(II) salt solutions, such as Fe(II) chloride solutions for example, can also be used for this purpose.

Particularly in the case of a neutral or basic electrolyte solution, the reduction of Cr(VI) present therein by Fe(II) results in the precipitation of the corresponding metal hydroxides (i.e. generally Cr(III) hydroxide and Fe(III) hydroxide). These hydroxides (and thus also the chromium to be removed) can therefore be simply separated off from the treated electrolyte solution, for example by filtration and/or centrifugation.

The method according to the invention can be carried out continuously or discontinuously. For example, in the method carried out continuously, the aqueous Fe(II)-containing solution of the electrolyte solution used for the electrochemical metal machining can be metered in continuously and preferably essentially stoichiometrically, depending on the amount of Cr(VI) ions produced in the electrochemical metal machining. The amount or concentration of the Cr(VI) ions formed can be determined, for example, by means of the amount of current flow in the metal machining By means of such a control system for adding the Fe(II)-containing solution, the chromium(VI) content of the electrolyte solution can be set to a defined target value.

In a preferred configuration of the method according to the invention, the method is carried out such that the amount of continuously metered in Fe(II) salt solution is such that the concentration of Cr ions in the electrolyte solution is in the g/l range, preferably below 1 g/l. The method according to the invention, however, in principle enables a concentration of Cr(VI) ions in the electrolyte solution which does not exceed 0.03 mg/l. It is also preferable using the method according to the invention that the Cr(VI) ions present in the electrolyte solution are reduced by more than 50%, for example at least 60%, at least 70%, at least 80%, or at least 90%.

The method according to the invention can be carried out, for example, essentially analogously to the method described in DE 10 2016 004 819, in which instead of ascorbic acid, the electrolyte solution comprising aqueous Fe(II) ions used in accordance with the invention is used.

Although the method according to the invention has been described based on the removal of Cr(VI) ions from an aqueous electrolyte solution, a person skilled in the art will recognize that this method can also be used for removing other (interfering) metal ions which can be reduced by Fe(II) ions and in reduced form preferably form a poorly soluble precipitate in the neutral to basic range. The present invention also captures such methods.

Although the present invention has been described in detail based on possible configurations, it is self-evident to a person skilled in the art that the invention is not restricted to these configurations but that many variations are possible in a manner wherein individual features can be omitted or features can be combined differently, as long as the scope of protection of the attached claims is not breached. The present disclosure discloses all combinations of all individual features presented.

BRIEF DESCRIPTION OF THE DRAWING

The only FIGURE in the accompanying drawing shows an embodiment of a device for the electrochemical processing of a workpiece.

The single FIGURE shows a configuration of a device 1 for the electrochemical machining of workpieces 2, more precisely for electrochemical metal machining (ECM/PECM), having a work table 3, which is adapted to bear a workpiece 2 to be machined, and an electrode tool 4, which is adapted to provide a machining operation on the workpiece 2. Likewise, delivery of the work table 3 towards the tool 4 is possible and contemplated. The device has a storage tank 5 from which an electrolyte solution 6 is fed out to the tool 4. A voltage source 12 provides a low-voltage voltage between tool 4 and workpiece 2. Electrolyte solution 6 flows around tool 4 and workpiece 2 when machining which, owing to the potential difference between tool 4 and workpiece 2, results in material ablation. For this purpose, in the device 1 shown, the electrolyte solution 6 is fed by means of at least one pump P via a feed line 8 from the storage tank 5 to the workpiece 2 to be machined. An intermediate container 7 collects the electrolyte solution 6 after flowing around workpiece 2 and tool 4. A return line 9 from the intermediate container 7 leads back to the storage tank 5. In the return line 9, diverse reprocessing facilities are provided for purification and decontamination of the electrolyte solution 6. The reprocessing facilities include a centrifuge 13, which eliminates solids as slurry 14, and filters 15 through which the electrolyte solution 6 passes. The device shown in FIG. 1 also has a bypass line 10, which leads directly from the storage tank 5 to the intermediate container 7. As a result, the electrolyte solution 6 can circulate via the intermediate container 7, passing the workpiece, to the storage tank 5. By means of a three-way valve 16, the ratio of the volume streams between bypass line 10 and tool 4 can be adjusted or one of the two streams can be completely shut off. In the example shown, an ion exchanger 11 with an ion exchange resin loaded with Fe(II) ions is provided in the bypass line 10. This enables the continuous or discontinuous feed of an Fe(II) salt solution to the electrolyte solution 6 according to one of the methods described above. Accordingly, the ion exchanger 11 preferably has the features which have already been described in detail in the description of the method according to the invention. A further advantageous possible arrangement of the ion exchanger 11 is in the return line 9 upstream of the centrifuge 13 and/or the filter 15. Positioning of the ion exchanger 11 in the feed line 8 is also a possibility.

REFERENCE NUMERALS

1 Device for electrochemical machining
2 Workpiece
3 Work table
4 Electrode tool
5 Storage tank 6 Electrolyte solution
7 Intermediate container
8 Feed line
9 Return line
10 Bypass line
11 Ion exchanger
12 Voltage source
13 Centrifuge
14 Slurry/slurry container
15 Filter
16 Three-way valve
P Pump

What is claimed is:

1. A method for removing Cr(VI) ions from an aqueous electrolyte solution, wherein the method comprises reducing Cr(VI) ions in the aqueous electrolyte solution to Cr(III) ions with Fe(II) ions, the Fe(II) ions being added to the electrolyte solution in the form of an aqueous salt solution which has been contacted with an ion exchange resin loaded with Fe(II) ions.

2. The method of claim 1, wherein the aqueous electrolyte solution is neutral or basic.

3. The method of claim 1, wherein the aqueous electrolyte solution has been used for electrochemical metal machining (ECM/PECM).

4. The method of claim 1, wherein the aqueous Fe(II)-containing salt solution is fresh.

5. The method of claim 1, wherein the aqueous Fe(II)-containing salt solution is a processed electrolyte solution for electrochemical metal machining.

6. The method of claim 3, wherein the electrochemical metal machining comprises machining a workpiece comprising a chromium-containing alloy.

7. The method of claim 3, wherein the electrochemical metal machining comprises machining a workpiece comprising a chromium-containing nickel-based alloy.

8. The method of claim 1, wherein the electrolyte solution comprises sodium nitrate.

9. The method of claim 1, wherein the ion exchange resin loaded with Fe(II) ions has been produced by treating an acidic ion exchange resin with an aqueous Fe(II) salt solution.

10. The method of claim 9, wherein the acidic ion exchange resin comprises a resin in Na form.

11. The method of claim 9, wherein the aqueous Fe(II) salt solution is an Fe(II) sulfate solution.

12. The method of claim 1, wherein metal hydroxide precipitate formed during reduction is removed.

13. The method of claim 12, wherein the precipitate is removed by filtration and/or centrifugation.

14. The method of claim 1, wherein the method is carried out continuously.

15. The method of claim 1, wherein the method is carried out discontinuously.

16. The method of claim 3, wherein the Fe(II)-containing solution is metered into the electrolyte solution continuously and dependent on the amount of Cr(VI) ions produced during the electrochemical metal machining.

17. The method of claim 16, wherein a chromium content of the electrolyte solution is set to a defined target value by controlling an addition of the Fe(II)-containing solution.

18. The method of claim 1, wherein the method is carried out such that a concentration of Cr(VI) ions in the electrolyte solution is not more than 1 g/l.

19. The method of claim 1, wherein the method is carried out such that more than 50% of the Cr(VI) ions present in the electrolyte solution are reduced.

20. A device for the electrochemical machining of a workpiece, wherein the device comprises:
- a work table adapted to support the workpiece to be machined;
- an electrode tool;
- a storage tank for feeding an electrolyte solution;
- a feed line for feeding the electrolyte solution from the storage tank to the workpiece to be machined by at least one pump;
- an intermediate container for collecting the electrolyte solution which has been fed to the workpiece;
- a return line for recycling the electrolyte solution to the storage tank from the intermediate container, and
- optionally, a bypass line for circulating the electrolyte solution via the intermediate container to the storage tank bypassing the workpiece,
- and wherein in at least one of the feed line, the return line and the bypass line an ion exchanger with an ion exchange resin loaded with Fe(II) ions is positioned.

* * * * *